United States Patent
Robinson et al.

(10) Patent No.: US 8,370,218 B2
(45) Date of Patent: Feb. 5, 2013

(54) SYSTEM AND METHOD FOR PREPAID BIOMETRIC REDEMPTION ACCOUNTS

(75) Inventors: Timothy L. Robinson, Reston, VA (US); Bradford R. Schildt, Boulder, CO (US); Tennille V. Goff, Springfield, VA (US); Daniel J. Corwin, Fredericksburg, VA (US); Timothy Neil Watson, Alexandria, VA (US)

(73) Assignee: Open Invention Network, LLC, Durham, NC (US)

( * ) Notice: Subject to any disclaimer, the term of this patent is extended or adjusted under 35 U.S.C. 154(b) by 247 days.

(21) Appl. No.: 12/335,953

(22) Filed: Dec. 16, 2008

(65) Prior Publication Data

US 2009/0099944 A1    Apr. 16, 2009

Related U.S. Application Data

(63) Continuation of application No. 11/187,836, filed on Jul. 25, 2005, now Pat. No. 7,483,862.

(51) Int. Cl.
*G06Q 30/00* (2012.01)

(52) U.S. Cl. .................................. 705/26.82; 705/26.81

(58) Field of Classification Search ..................... 705/26
See application file for complete search history.

(56) References Cited

U.S. PATENT DOCUMENTS

| | | | |
|---|---|---|---|
| 5,291,004 A | 3/1994 | Frank et al. | |
| 5,556,327 A | 9/1996 | Jenkins et al. | |
| 5,892,900 A | 4/1999 | Ginter et al. | |
| 6,067,532 A | 5/2000 | Gebb | |
| 6,192,142 B1 | 2/2001 | Pare, Jr. et al. | |
| 6,205,436 B1 | 3/2001 | Rosen | |
| 6,633,849 B1 | 10/2003 | Dodd | |
| 6,663,006 B2 | 12/2003 | Mullins et al. | |
| 6,873,969 B2 | 3/2005 | Stone et al. | |
| 6,910,627 B1 | 6/2005 | Simpson-Young et al. | |
| 7,483,862 B1 | 1/2009 | Robinson et al. | |
| 2002/0016738 A1 | 2/2002 | Coile | |
| 2002/0046135 A1 | 4/2002 | Lage | |

(Continued)

FOREIGN PATENT DOCUMENTS

EP    1065637 A2    1/2001
JP    2006318495    11/2006

(Continued)

OTHER PUBLICATIONS

WKMG—TV 6, Local6.com, Finger Scanning at Disney Parks Causes Concern, www.local6.com/news/4724689/detail.html, Jul. 14, 2005, updated Jul. 15, 2005.

*Primary Examiner* — Seye Iwarere
(74) *Attorney, Agent, or Firm* — Haynes and Boone, LLP

(57) ABSTRACT

A system and method of offering a redemption account that allows users to purchase in advance and subsequently redeem products and services from one or more vendors that are affiliated with the system. The present invention imparts a process by which users enrolled in a biometric authorization system can access a redemption account for advance purchased products and services by submitting their biometric data. Information stored in the user record can then be utilized to enable the fulfillment of the advance purchase.

20 Claims, 2 Drawing Sheets

System Overview

U.S. PATENT DOCUMENTS

| | | |
|---|---|---|
| 2002/0116260 A1 | 8/2002 | Szabo et al. |
| 2002/0116626 A1 | 8/2002 | Wood |
| 2002/0169694 A1 | 11/2002 | Stone et al. |
| 2003/0070080 A1 | 4/2003 | Rosen |
| 2003/0149662 A1 | 8/2003 | Shore |
| 2004/0192438 A1 | 9/2004 | Wells et al. |
| 2005/0001711 A1 | 1/2005 | Doughty et al. |
| 2005/0251440 A1 | 11/2005 | Bednarek |
| 2006/0046842 A1 * | 3/2006 | Mattice et al. ............ 463/29 |
| 2007/0011464 A1 | 1/2007 | Gorelik et al. |
| 2007/0288319 A1 | 12/2007 | Robinson et al. |

FOREIGN PATENT DOCUMENTS

| | | |
|---|---|---|
| WO | WO 98/10361 A1 | 3/1998 |
| WO | WO 99/06928 A1 | 2/1999 |
| WO | WO 01/09795 A1 | 2/2001 |

* cited by examiner

FIG. 1 - System Overview

ADVANCE PURCHASE & REDEMPTION VIA BAS

SYSTEM AND METHOD FOR PREPAID BIOMETRIC REDEMPTION ACCOUNTS

CROSS-REFERENCE TO RELATED APPLICATION

This application is a continuation of and claims priority to U.S. patent application Ser. No. 11/187,836, filed Jul. 25, 2005, which is incorporated by reference herein in its entirety for all purposes.

FIELD OF THE INVENTION

This application relates generally to the advance purchase and redemption of products and services. More particularly, the present invention relates to a system and method for implementing a pre-purchased biometrically enabled redemption account for selected vendors.

BACKGROUND OF THE INVENTION

Generally, current methods of redeeming or accessing pre-purchased travel and event products and services are inconvenient for purchasers, requiring that they carry tickets, tokens, or present token-based confirmation of their identity. Such tickets or tokens may be stolen from or lost by the purchaser, misused by third parties, or improperly resold to a third party. What is needed is a more secure and convenient method of redeeming or accessing pre-purchased travel and event products and services.

SUMMARY OF THE INVENTION

The present invention addresses the aforementioned needs by providing a system and a method for conveniently and securely accessing pre-purchased goods or services from selected vendors via a redemption account linked to a biometric authorization system.

BRIEF SUMMARY OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
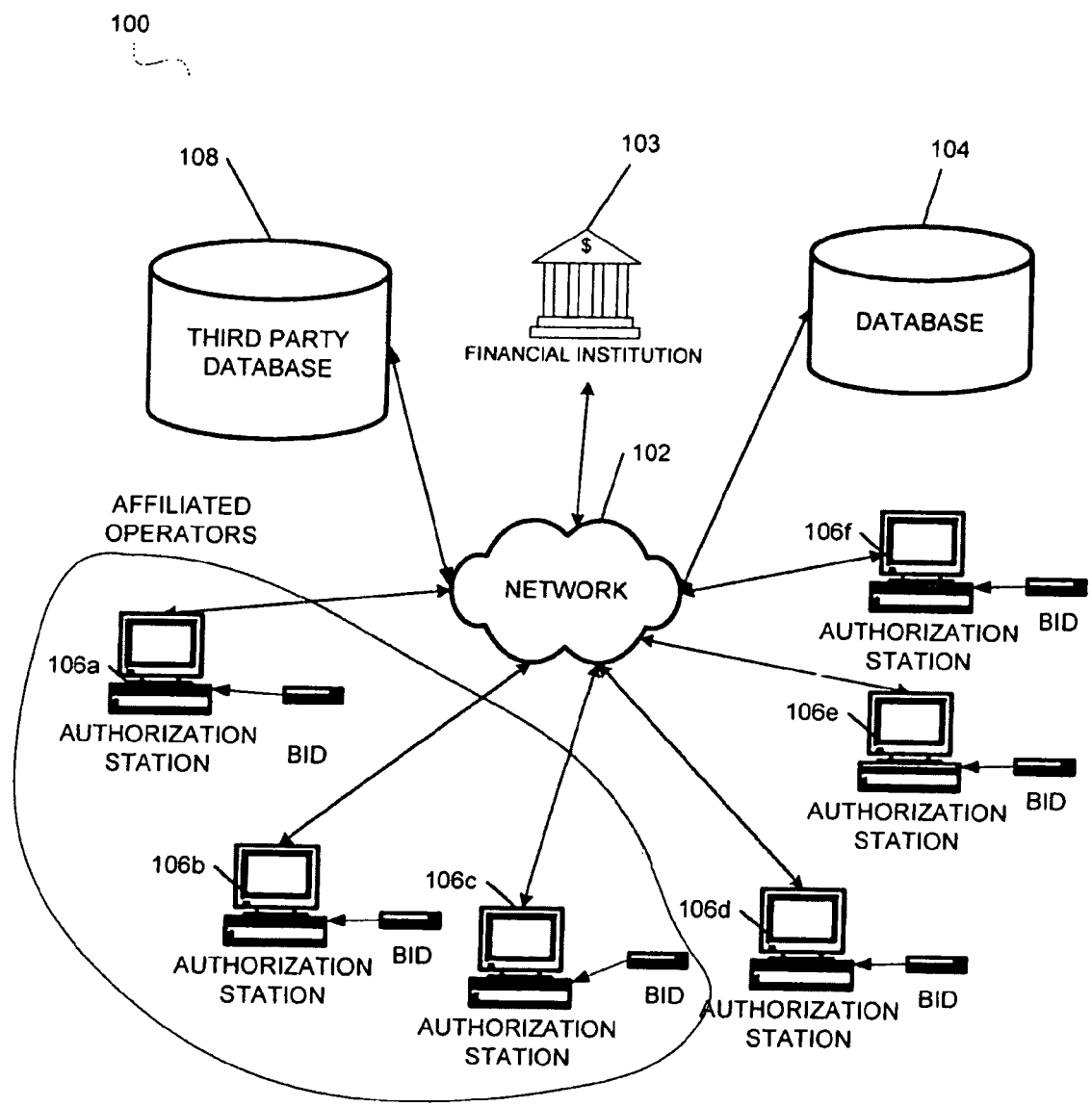
FIG. 1 illustrates a general architecture overview of a biometric authorization system (BAS).

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Methods of accessing and redeeming pre-purchased packages for accommodations, events, food and beverage, transportation and the like typically require that purchasers wear or carry tokens, such as wristbands or paper tickets, or present conventional confirmation of their identity to access the pre-purchased goods and services. Such tokens and IDs may be easily lost, misplaced or stolen, and tickets or access tokens may also be sold to other individuals, sometimes at a higher price than that paid by the initial purchaser. This "gray market" might be particularly troublesome to a merchant that sold the original package or event access at a discounted rate; an unscrupulous user might undercut the merchant's price at the point of access and still turn a profit on the transaction.

Additionally, travel and vacation destinations often involve locales, such as beaches or ski slopes, where carrying cash, identification and/or financial tokens to purchase refreshments or gain access to events is inconvenient. Reducing the necessity to carry cash, financial tokens and identification tokens would lessen a traveler's risk of loss through theft or fraud, and merchant risk of loss due to counterfeited tickets and tokens would also be reduced. Moreover, merchants, such as travel service providers, lack a convenient means of confirming a consumer's identity and authorizations at the redemption point.

It is a feature of the present invention to offer a pre-paid and biometrically accessed redemption account that allows users to buy products and services in advance from one or more merchants that have chosen to affiliate with and offer their services through the system. In some instances, the account could indicate a specified value redeemable at select locations, while in other instances, the account could indicate a number of particular items, events, or services that the user can redeem at his destination.

The present invention offers a significant advantage to purchasers of pre-arranged packages or event access by allowing them to obtain a pre-paid redemption account whereby they can access the events, products or services they have paid for without tickets, wrist bracelets, IDs, or other types of tokens that may be easily lost or stolen. It is a feature of the present invention that the user can submit biometric data before, at, or subsequent to the time of purchase that can then be used to access the pre-purchased product or service to the extent that the user is eligible. Additional advantages include the inherent security of a biometric system; the user need not worry about theft or fraud that might result from lost, stolen or duplicated tickets and tokens. Furthermore, a merchant is less likely to suffer losses or disputes regarding access to their products and services due to counterfeited tickets and tokens.

Another advantage of the present invention is that it allows sellers of advance purchase packages or event access to confirm that users who redeem their purchases are eligible to do so. For example, a spring break traveler who pre-purchased access to age-restricted beverages or event locations can verify his age and identity by submitting his biometric data. This can help protect merchants from liability issues associated with under-aged drinkers while affording the purchaser the convenience of leaving behind his wallet and identification tokens.

As another advantage, the present invention offers merchants a means for generating new business and increasing customer traffic by pre-selling access to their products or services, for example, as part of a package offered to vacation travelers. A traveler will be more likely to choose a product or service provider that is part of an attractive, pre-selected, and possibly discounted, package than other providers. Such a package becomes particularly appealing to the vacation traveler when it is redeemable with the simplicity and convenience of biometric authorization, rather than tokens, tickets, vouchers, conventional IDs and the like.

In general, a biometric authorization refers to an authorization in which either a user, an operator, such as a merchant or clerk, or an agent, such as an employee of the BAS, provides biometric data to be matched against a biometric record in a database. For example, a user may undergo biometric authorization to redeem an advance purchase, complete a financial transaction or to gain access to an age-restricted product. As would be appreciated, the location of the database as well as the specific mechanism by which the biometric data is matched to a particular biometric record would be implementation dependent and would not be limiting on the scope of the present invention. Thus, in a biometric authorization, the biometric data taken during the authorization can be matched against registered biometric data at a location where the registered biometric data is stored or where the authorization biometric data is gathered. In addition, biometric data received during an authorization can be tested for liveness to prevent system fraud. Alternatively, the BAS can provide non-biometric access for users who have nonviable biometric data or for users who wish to employ the BAS without the use of biometric data.

Additionally, the principles of the present invention are not limited to using one form of biometric. For example, the biometric data referred to throughout this description can represent a biometric image (or sample) and/or a mathematical representation of the biometric image, often referred to as a biometric "template". In one example, a biometric template can represent any data format that includes feature, positional, or other representing information of characteristics of biometric data. Alternatively, a template can be a mathematical representation of more than one biometric. For example, a user template may be generated from biometric data acquired from two individual fingers, such as a thumb and index finger, or from a finger and an iris scan. The biometric data can include fingerprint data, iris data, facial data, voice data, retinal data, hand architecture data, DNA data, or any other physical measurement pertaining to a user's person.

FIG. 1 illustrates a general architecture overview of BAS 100. As will be described in greater detail below, BAS 100 enables a convenient redemption process for pre-purchased products and services for users. Transaction information, which could include information such as the type, amount, value, of the pre-purchased products and services, as well as any limitations and/or conditions of their redemption, is stored in database 104 in association with a user record. Database 104 may represent one or more databases utilized within the system. In one embodiment, database 104 is a central database to which all user records are stored and from which user records are accessed for biometric authorization and/or pre-purchased transaction redemption. In another embodiment, database 104 also includes one or more operator databases to which a select set of operator records are stored and from which a select set of operator records are accessed for biometric authorization if needed. In an additional embodiment, BAS 100 may also utilize a combination of central databases and one or more operator databases. In general, embodiments utilizing a combination of databases enable increased control of information flow throughout BAS 100. As described in detail below, various examples of information flow configurations within the system can include both a shared set of affiliated operators and "closed" system models. In one embodiment of the present invention, user information could be shared among a select set of affiliated operators offering products and services as part of the pre-sold package. In still further embodiments, database 104 can further comprise one or more sub-databases that are contained within a particular database. In such embodiments, user data, operator data, and other system data may be distributed across multiple databases within database 104.

A user record holds a variety of information allowing BAS 100 to provide highly flexible functionality for advance purchase transactions and redemptions. When enrolling in BAS 100, a user can present any number of identity verifying documents or testaments to his identity depending on the implementation of the system. By way of illustration and not of limitation, examples of such documents or testaments include a financial token, a digital image, a video clip, family information, a DNA sample, government identification or work identification. A user record holds user identifying data that can be employed by BAS 100 to identify a user redeeming an advance purchase, such as a user's biometric data, preexisting token data and/or user-knowledge-based, "out of wallet" information. Additionally, the user record can hold other user information, such as name, address, phone number, email address, loyalty information, SID, PIN's, passwords and other user identifiers, and/or other identity verifying information related to an individual seeking authorization within the system. A user record may also contain additional background information, scoring information, and/or time of enrollment data (which may be included for the totality of the user record or for particular fields within the user record). Furthermore, a user record can include financial data, such as information pertaining to credit cards, debit cards, checking account and routing information, and the like. Such financial data can be utilized for processing advance purchase payment.

In addition, a user record can include data regarding other individuals authorized to redeem advance purchased products and services via BAS 100. For example, a user can allow additional family members to redeem advance purchased access to an amusement park. These authorized individuals can be enrolled in BAS 100 and have their own user records linked to the user's or can be solely associated with the user's record. Authorized individual data can include a variety of information, such as biometric data, preexisting token data, identifiers, and/or other identity verifying information related to the authorized individual. If the authorized individual is himself a user in BAS 100, authorized individual data in one user record can direct the system to the authorized individual's own user record. A user can establish parameters for authorized individuals included in his record. For example, a user can indicate that a particular authorized individual, such as a child of a user making an advance purchase, can redeem only specified portions of the advance purchase. For example, the child might be authorized to redeem event access, but not be authorized to redeem pre-purchased food and beverage items without the authorization of the user.

Additionally, a user record can contain information pertaining to the user's advance purchase transactions. Advance purchase data can include the brand or type of product or service purchased, participating merchants, the amount or value of products and services to be redeemed, limiting locations, dates or time periods, other restrictions on redemption, and the like.

The user record can be maintained for continuous use or for a limited amount of uses. For example, BAS 100 can function on a single advance purchase transaction basis in which the user record is only maintained until the advance purchase is fully redeemed. After the advance purchase has been fully redeemed, the user record can be deactivated or eliminated.

In one scenario, BAS 100 can be part of a broader system that processes authorizations for other applications in addition to advance purchases and redemptions. For example, the system can conduct financial transactions, age-verification, vehicle rental procedures, locker rentals or the like. Enrollment in BAS 100 can include configuring a user record in this broader system to handle advance purchase transactions and redemptions. Additionally, an enrollment promotion can be incorporated with user enrollment. For example, a user that registers via the Internet could pre-purchase a discounted vacation package through a travel services merchant affiliated with BAS 100.

An operator record can be designed to include information useful for authenticating an operator, such as a name or ID number, device ID numbers associated with the operator, an address, and a phone number. An operator may be an individual or entity that has administrative capabilities in a BAS, but is not directly employed by the BAS. These capabilities may range from being permitted to oversee a biometric authorization to having access to user records. For example, in the present invention, an operator may be a travel agent or a merchant. In an alternate embodiment of the present invention, the operator records also include employer information if the operator is an employee of an employer who is also an operator. In another embodiment of the present invention, operator records include an operator identifier, such as an SID, and/or operator biometric data. In one scenario, an operator may need to undergo biometric authorization before administering a user's biometric authorization.

Database 104 and third-party database 108 are connected to network 102, which may be, but is not limited to, the Internet. Networks used in additional embodiments include local area networks (LANs), wide area networks (WANs), and telephone networks. Network 102 comprises connections to at least one of a plurality of authorization stations (AS) 106a-106f where a user can be biometrically authorized. AS's 106a-106f can include, but are not limited to, at least one attached biometric input device (BID) and the necessary means for sending and receiving information to and from a user and to and from a database. These stations include but are not limited to a vending machine, a kiosk, a personal computer, a user service desk, a point of sale terminal, a telephone, and a wireless device connected via a wireless network. The BID is illustrated in FIG. 1 as a peripheral device for purposes of emphasis only. AS's 106a-106f could also include integrated BID's. In one embodiment, one or more of AS 106a-106f could simply be a BID connected to BAS 100.

Additional embodiments of the system also comprise connections to one or more third party information sources, such as third-party database 108, in which user information, including user biometric data, is verified and/or from which user information, such as redemption information, is retrieved. In an additional embodiment, the system can be connected to one or more financial sources in order to facilitate the initial financial transaction. For example, a user record stored at database 104 may indicate an account held at a financial institution 103 from which a user would biometrically authorize payment for pre-purchased packages.

Information transferred in the system can be encrypted. For example, information may be encrypted at one point and sent across a non-secure connection between points or not encrypted at a point of communication and sent to the other point of communication across a secure connection. Encryption and decryption of these messages can be monitored by services provided by a security company such as VeriSign. In one scenario, as an added level of security, information internal to a terminal and which is never transmitted can also be encrypted. This prevents retrieval of sensitive information (e.g., biometric data) from a stolen terminal. In an additional embodiment, the system incorporates one or more anti-tampering methods by which to recognize authentic and non-authentic system requests.

In one embodiment of the present invention, user information is shared among a subset of affiliated operators and stored in select multiple-operator databases or select multiple-operator partitions within database 104. In this embodiment, a group of operators share data with each other regarding users who have pre-purchased products and services from the affiliated operators or from an agent acting on their behalf. This system allows affiliated operators to share information without sharing that information with all other non-designated operators who might be registered in the system. For example, if BAS 100 is also set up to perform biometrically authorized financial transactions, the pre-purchased redemption account information might only be accessible to an affiliated subset of operators, as an example utilizing AS's 106a-106c, who have offered their products and services as part of the pre-purchased redemption package, and not by all operators who might utilize BAS 100 for processing financial transactions, i.e., those utilizing AS's 106d-106f. Information in such a system can be shared between one or more databases freely or sharing can be monitored by rules set in the one these databases or a combination thereof. By way of illustration and not as a limitation, one operator might only want to share user authorization information with one of five selected operators; for example, a cruise ship line might share authorization information with selected merchants located at various ports of call visited by the line.

In another embodiment, the system is configured as a closed, single operator system, where information entered into the system via a specific operator AS is transmitted to and stored in database 104 specific to that operator, and this information is not shared with another AS or database. This is referred to as a "closed" system because users need to enroll in the database in which they would like to perform biometric authorizations. For example, if one operator both provides and dispenses all of the products and services included in the pre-purchase, the operator might desire a closed system. A "closed" BAS 100 operated by Disney Corporation, for example, might be used both to pre-sell and authorize redemption of accommodations, event and theme park access, food and beverages, parking and the like. Database 104 in closed systems can communicate with other databases, such as third-party database 108. However, all user information that is enrolled into a particular database is stored in that database. In an alternate embodiment of the closed system, information is stored in a partitioned database 104. Operator related information is stored in operator-specific partitions and is closed to all other operators. Only an authorized operator and authorized entities, such as an agent, may access that partition of database 104. In yet an additional embodiment, information stored in one database or database partition can be stored in another database or database partition. Such an embodiment is useful for information protection in the event database information is lost.

The configuration of the system as a "shared among affiliated operators" system or a "closed", single-operator system illustrates various ways of implementing the principles of the present invention. System configuration might be determined by the system in which user information is used. As previously mentioned, a merchant who is an operator in the system and who markets packages of pre-purchased products and services for travelers coming to his location might have a system configured with his own database. In this system configuration, the merchant's database files only exist on the database and are retrieved or accessed for biometric authorization only by pre-determined stations connected to the database; therefore, the system would be a "closed" system.

Figure 2:
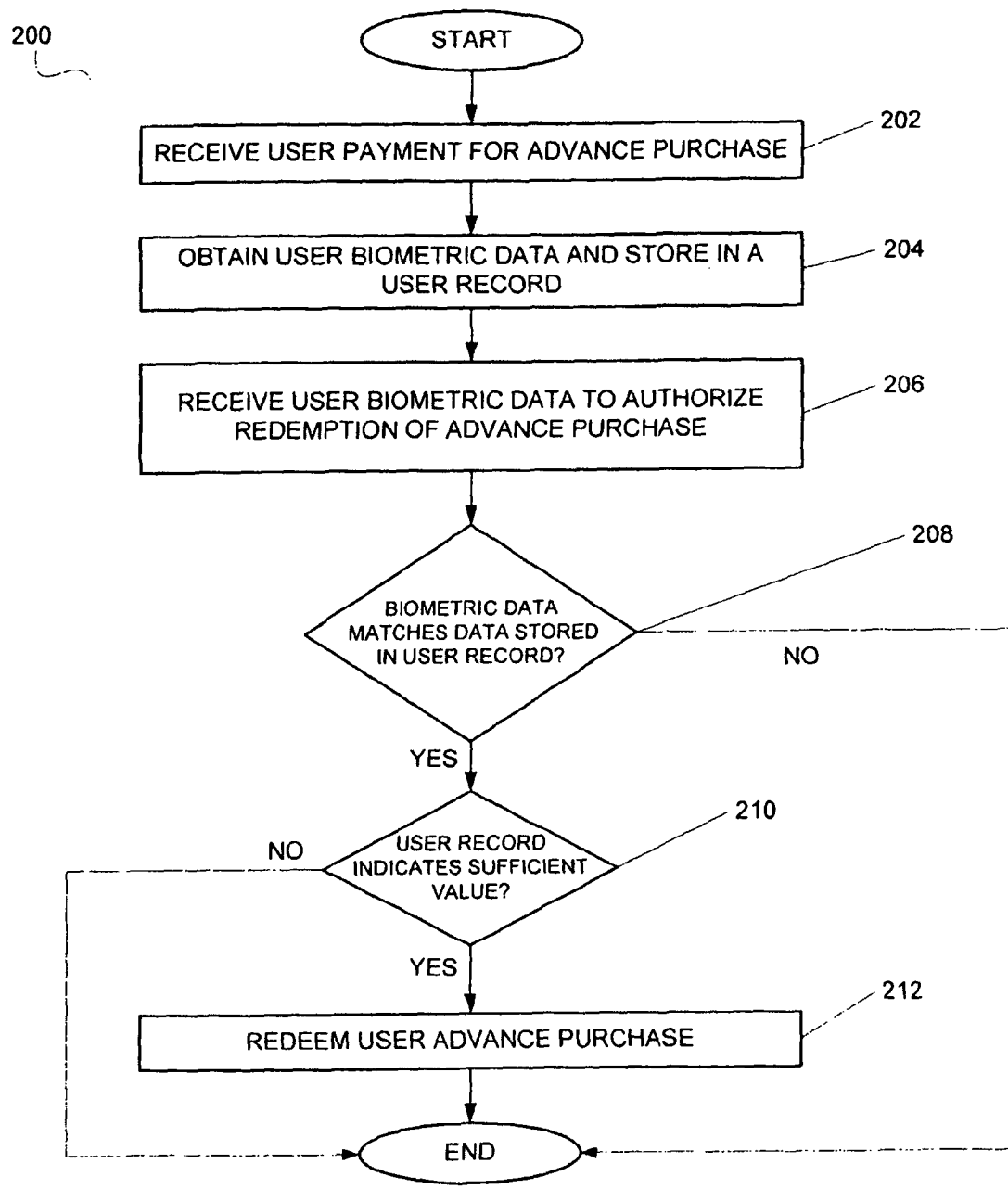
FIG. 2 illustrates a flowchart of a process of redeeming or accessing pre-purchased products, events and accommodations from selected vendors via a redemption account connected to a BAS.

FIG. 2 illustrates a process for making an advance purchase and redeeming a portion or all of the advance purchase at a authorization station via BAS 100.

At step 202, a user tenders payment for an advance purchase of a product or service to be redeemed at a later date. In one embodiment, the products or services are offered as a package, which could be related to a particular destination. For example, an operator employed by a travel agency or travel service provider could pre-sell a vacation package to a user including access to events, products, or services provided by affiliated operators at the user's desired travel destination. Additionally, the products and services could be discounted only for packaged pre-sale. In another embodiment, the user agrees to complete payment at a later time, but prior to redemption of the products or services. The user could make a deposit on the package at the time of purchase or simply agree to a schedule of payments.

At step 204, the user's biometric data is obtained and stored in a user record along with other user information as required. For example, identity verification information, purchase information, financial account information, age verification information and the like can also be entered into the user record. If the user is already enrolled in BAS 100, the biometric data could be confirmed by comparison with biometric data previously stored in the user record to authorize payment for the package of products and services. If the user is not enrolled in BAS 100, he could enroll at the time of purchase, or a temporary enrollment could be created for the user that would be valid until the purchase was fully redeemed or until the expiration of a fixed period of time. Once the user is properly enrolled and has pre-paid for the products and services, the user or other authorized individuals can then proceed to redeem the pre-paid products and services.

At step 206, the user presents his biometric data to redeem at least a portion of the advance purchase. For example, the user may attend a special event at a drinking establishment at his vacation destination, or the user may have pre-paid for a set number of products, such as meals or beverages, and could submit biometric data to redeem each meal or beverage. At step 208, the user's submitted biometric data is compared to registered biometric data in the user record to determine if the user is eligible to redeem the advance purchase. If the received biometric data sufficiently matches the registered biometric data and a determination is made, at step 210, that the associated user record stores adequate redemption value, the user is deemed eligible.

If the user is determined to be eligible, at step 210, the user redeems at least a portion of the advance purchase at step 212. Redemption could involve receiving a product from a merchant affiliated with the system, or receiving access to a location or event. For example, access might be provided to a happy hour or party for advance purchase holders only, to a hotel, and/or to an attraction or other entertainment venue.

In one embodiment, if the system determines, at step 210, that the user's advance purchase has been fully redeemed, full redemption of the advance purchase could be noted in the user record. In another embodiment, the user record could be deleted upon full redemption of the advance purchase. The user could additionally be notified when the advance purchase has been fully redeemed, and could be given the option to pre-purchase additional products and services. In an embodiment where user enrollment is typically temporary, the user could also be given the option to maintain his user record in the system as a convenience should he wish to initiate an additional advance purchase transaction at a future date. The user might alternatively be notified of an impending user record expiration and offered the opportunity to renew the user record, possibly for a fee.

In an additional embodiment, the user could redeem products or services, such as pre-purchased beverage or food items, by presenting biometric data at AS 106. For example, the user could receive printed conventional event tickets by submitting biometric data at an authorization station configured to function as a ticket-vending kiosk. For the dispensing of alcoholic beverages, the machine could be additionally enabled to control or limit distribution of products based on system parameters, such as an additional age verification by an attending operator, for example, an amount distributed in a designated time period, or a breathalyzer requirement. An AS 106 equipped with a vending machine could also be monitored by a camera or an attendant to make it more difficult for the user to obtain an age-restricted product illegally for an under-age companion.

In an alternate embodiment, the user's advance purchase package could include a prepaid value account that would allow him access via the presentation of biometric data to multiple participating merchants in a particular locale or locales. For example, a user who pre-purchases a travel package through a cruise line could be able to use his biometric to redeem products and services at one or more merchants located at the ports-of-call his cruise ship visits, as well as on the ship itself. The account could have an auto-refill feature that reloads the redemption value after the limit is met. Alternatively, the system could charge the user's credit card if the redemption value is exceeded. The redemption value would only be redeemable at approved merchants affiliated with the system, and only for specific products or services.

In an additional embodiment, the user can adjust his prepaid redemption account via any available authorization station in communication with the system, such as a kiosk, service desk, system website or a handheld wireless device. For example, the user could be allowed to add more value to the advance purchase, cancel the advance purchase, request a refund of a portion of the value of the advance purchase, provide information about authorized additional users, alter one or more products or services included in the advance purchase, alter the time and location of redemption, or receive and take advantage of other offers and incentives from system merchants.

As noted, in one embodiment, more than one individual could be authorized to redeem the advance purchase. Such authorization could occur at the initial purchase, or the initial purchaser could add authorization to one or more authorized individuals, provided that the authorized individuals are able to present biometric data to the system or sufficient identification to verify their identity. For example, a user who pre-purchases multiple tickets to a theme park could designate one or more additional individuals as authorized to redeem the pre-purchased tickets and provide necessary identity-verification information about the authorized individuals to enable their redemption of the tickets. In one scenario, a user whose pre-purchase includes access to Disney World for her family might additionally authorize her husband and one or more of her children for redemption of the access, even should the user herself not be present at redemption authorization. The authorized individuals could already be enrolled in the system, could submit necessary identifying information at the time of pre-purchase, or could submit the necessary information, such as their biometric data, at a system kiosk or other authorization station subsequent to the purchase but prior to or during redemption of the purchase. In another embodiment, the authorized individuals could redeem pre-purchased products and services without registering biometric data with BAS 100, so long as they were accompanied by the user. For example, the mother who pre-purchases access for her family to Disney World as part of a vacation package might redeem access for five persons, including herself, her husband, and three children, by presenting her biometric data at an entry authorization station. Information contained in her user record could indicate that her redemption was valid for the number of persons authorized by the advance purchase. The user could additionally place limitations on the pre-purchased products or services that authorized individuals could redeem. For example, the user might authorize her children for access to Disney World, but not for pre-purchased food or beverage services, the redemption of which could still require the primary user's presence at the redemption point.

In an additional embodiment, the purchasing user could also transfer redemption authorization for the advance purchase to a second user. In this embodiment, the purchasing user relinquishes redemption rights to the second user, rather than adding additional authorized individuals. For example, the user might be unable to attend an advance purchased event, such as a concert, and authorize a second user to redeem his purchase. The purchasing user could provide necessary information about the second user to enable transfer of the authorization. For example, if the second user is enrolled in the biometric authorization system, the purchasing user could provide the second user's name or a system identification code. If the second user is not enrolled in the system, the purchasing user could communicate information to the second user to enable the transfer. For example, the system could provide the purchasing user with a pass code related to the advance purchase, which could be communicated to the second user. The second user could then enroll in the system at an authorization station, such as a kiosk, service desk, web site or wireless communication device, by submitting required identification information and their biometric data. The enrolled second user could then submit the pass code received from the purchasing user in order to enable the transfer of redemption authorization for the advance purchase.

In one embodiment, the system could act as a trusted middleman or broker between a first user who has pre-purchased a product or service, such as event access, and a second user who wishes to acquire the pre-purchased product or service redemption rights from the first user. The system could verify that the first user is the authorized holder of redemption rights to the pre-purchased product or service and could implement the transfer of authorization to the second user. The system could communicate to the second user a confirmation of the legitimacy of the pre-purchased redemption authorization and verifying the transfer of redemption rights. The system could additionally provide a venue or forum for transfers of pre-purchased products and services, such as an online web forum, message board and the like.

The system could also place velocity limits on additional user authorizations in order to prevent gray market reselling of the advance purchases. For example, a user could only authorize an additional user or users for a pre-purchased event access a specified number of times, or the user could be assessed an additional fee for reassigning authorization to another user (for example, the amount a ticket was originally discounted) to prevent professional scalpers from abusing the system. The user could additionally be required to obtain pre-approval from the system in order to transfer redemption authorization to additional users. For example, the user could request a pass code related to his advance purchase to enable transfer of redemption authorization to a second user. The system could require a name or other information related to the second user before providing the requested pass code. If a system venue, such as the previously mentioned message board or web forum, were used to facilitate the sale of redemption authorization, the system might also set limits on the resale price, such as requiring that resale not be for an amount above market value, and/or set other resale parameters as desired. BAS 100 could additionally charge the purchasing user and/or the second user a transfer fee for the resale of redemption authorization for the pre-purchased products or services through the system.

In another embodiment, user biometric data submitted at the time of pre-purchase and at the point of redemption might additionally be verified by comparison and matching with registered user biometric data stored at third-party database 108, such as a government driver's license/identification database.

A system and method of offering a redemption account that allows users to buy in advance and subsequently redeem products and services from one or more merchants networked with a biometric authorization system has been illustrated. It will be appreciated by those skilled in the art that the system and method of the present invention can be used to offer and provide access to the redemption of the pre-purchased products and services via a biometric authorization system. It will thus be appreciated by those skilled in the art that other variations of the present invention will be possible without departing from the scope of the invention disclosed.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the above description should not be considered to be exclusive of these other embodiments. Also, it is to be understood that the phraseology and terminology employed herein are for the purposes of description and should not be regarded as limiting.

What is claimed is:

1. A method for enabling the provision of a product via a biometric authorization system, the method comprising:
   receiving, at a first authorization station, a purchase request from a user to purchase a product, wherein said purchase request includes first biometric data from said user;
   receiving, at said first authorization station, payment for said product, wherein said product is not provided to said user upon payment receipt;
   storing, at a database, purchase information in a record, wherein said purchase information comprises stored biometric data from said user and data identifying said product;
   receiving, at a second authorization station, a redemption request from said user to obtain said product, said redemption request comprising submission of second biometric data from said user;
   identifying, via said second authorization station, said user based upon said second biometric data sufficiently matching said stored biometric data;
   determining, at said database, said product associated with said user; and
   authorizing, via said second authorization station, said redemption request to obtain said product.

2. The method of claim 1, wherein said product comprises at least a portion of a package related to one or more of a place, an event, and an attraction.

3. The method of claim 1, wherein said receiving payment for said product comprises performing a biometric authorization of said user.

4. The method of claim 1, further comprising generating said electronic record.

5. The method of claim 1, wherein said electronic record is an existing user record.

6. The method of claim 1, wherein said purchase information further comprises user age data.

7. The method of claim 6, further comprising:
verifying, at one or more of said first authorization station and said second authorization station, an age of said user by accessing said user age data, and
determining whether to provide said product to said user based on an age restriction.

8. A method for enabling the provision of a product via a biometric authorization system, the method comprising:
receiving, at a first authorization station, a purchase request from a first user to purchase a product, wherein said purchase request includes biometric data from said first user;
receiving, at said first authorization station, payment for said product, wherein said product is not provided to said first user upon payment receipt;
storing, at a database, purchase information in a record, wherein said purchase information comprises stored biometric data from said first user and data identifying said product;
receiving, at said first authorization station, an authorization, from said first user, to enable provision of said product to a second user;
associating, at said database, first identifying information of said second user with said electronic record;
receiving, at a second authorization station, a redemption request from said second user to obtain said product, said redemption request comprising second identifying information submitted by said second user;
identifying, via said second authorization station, said user based upon said second identifying information sufficiently matching said first identifying information;
determining, at said database, whether said product associated with said second user, and
authorizing, via said second authorization station, said redemption request.

9. The method of claim 8, wherein said receiving payment for said product comprises performing a biometric authorization of said first user.

10. The method of claim 8, wherein receiving authorization from said first user to enable the provision of said product to a second user comprises performing a biometric authorization of said first user.

11. The method of claim 8, wherein associating first identifying information regarding said second user with said electronic record comprises receiving first identifying information directly from said second user.

12. The method of claim 8, wherein associating first identifying information regarding said second user with said electronic record comprises utilizing first identifying information maintained in a second electronic record associated with said second user.

13. The method of claim 8, wherein said first identifying information comprises biometric data.

14. The method of claim 8, wherein said authorization to enable the provision of said product to said second user is limited according to one or more system parameters.

15. A method for enabling the provision of a product via a biometric authorization system, the method comprising:
receiving, at a first authorization station, a purchase request from a user to purchase a product;
obtaining, at said first authorization station, first biometric data from said user;
receiving, at said first authorization station, payment from said user for said product, wherein said product is not provided to said user upon payment receipt;
enabling, via a database, said user to access said product via a first biometric authorization of said user;
maintaining, at said database, purchase information in an electronic record, wherein said purchase information comprises stored biometric data from said user and data identifying said product;
receiving, at a second authorization station, a redemption request from said user to obtain said product, said redemption request comprising submission of second biometric data from said user;
identifying, at said database, said electronic record associated with said product; determining, at said database, expiration data associated with said electronic record;
evaluating, at said database, said second biometric data based on said determining; and
authorizing provision of said product to said user based on said evaluating.

16. The method of claim 15, wherein said product comprises at least a portion of a package related to one or more of a place, an event, and an attraction.

17. The method of claim 15, wherein said receiving payment for said product comprises performing a second biometric authorization of said user.

18. The method of claim 15, wherein said electronic record expires after said product has been provided.

19. The method of claim 15, wherein said electronic record expires after a period of time.

20. The method of claim 15, further comprising deleting said electronic record based on said expiration data.

* * * * *